Sept. 23, 1924.
C. P. GEORGE
1,509,647
ATTACHMENT FOR MOWING MACHINES
Filed Sept. 30, 1922   2 Sheets-Sheet 1
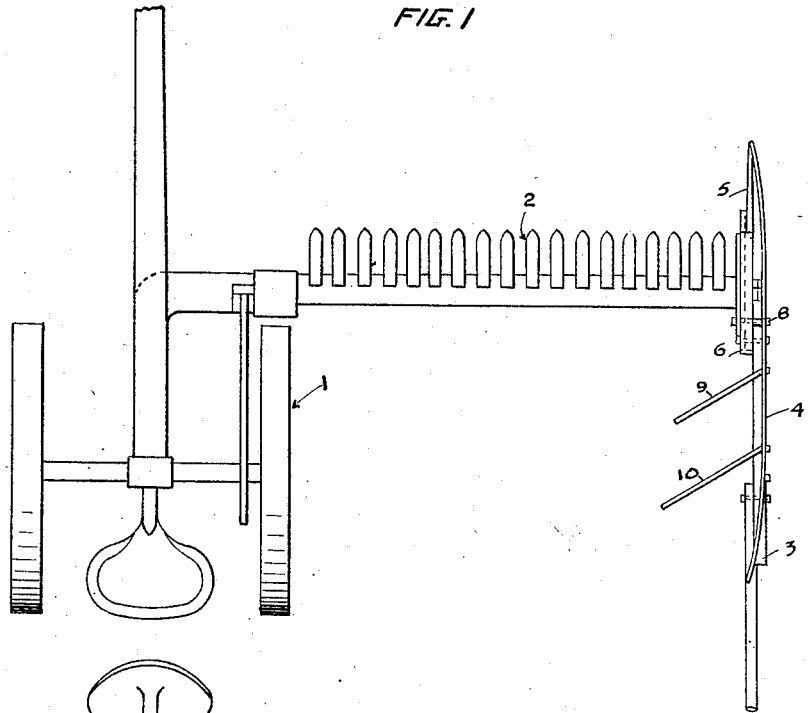
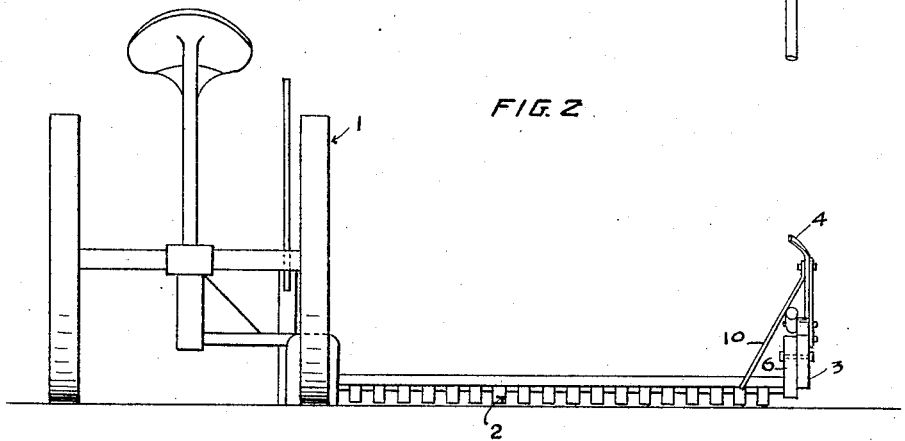
INVENTOR
C. P. GEORGE
ATT'YS.

Sept. 23, 1924.  1,509,647
C. P. GEORGE
ATTACHMENT FOR MOWING MACHINES
Filed Sept. 30, 1922    2 Sheets-Sheet 2

INVENTOR
C.P. GEORGE
BY
ATT'YS.

Patented Sept. 23, 1924.

1,509,647

UNITED STATES PATENT OFFICE.

CHRIS P. GEORGE, OF SAN LUIS OBISPO, CALIFORNIA.

ATTACHMENT FOR MOWING MACHINES.

Application filed September 30, 1922. Serial No. 591,622.

*To all whom it may concern:*

Be it known that I, CHRIS P. GEORGE, a citizen of Portugal, residing at San Luis Obispo, in the county of San Luis Obispo and State of California, have invented new and useful Improvements in Attachments for Mowing Machines, of which the following is a specification.

This invention relates to an improvement in mowing machines and resides in the provision of an attachment for such machines, which attachment will facilitate the operation of the machine and prevent injury to the grain, hay and other material being cut by the mower.

The primary object of the invention is to provide an attachment for a mowing machine which will throw the hay or grain which has been cut into a position whereby it will be clear of the mower when the latter is operated to cut the next adjacent row of grain. With the ordinary mower the hay or grain which is cut near the outer end of the mower will fall outwardly against the edge of the standing grain or hay, and as the mower is advanced so as to cut the next row, the cut grain or hay will be again cut or have the heads cut off, during the cutting operation.

My invention contemplates a guide member which will cause the hay or grain cut at the outer end of the mower to be directed rearwardly and inwardly from the outer end of the mower whereby when the mower is advanced for the next row it will clear the cut grain or hay.

An object of the invention is to provide a simple and inexpensive attachment of the character described which may be readily and easily attached to a mowing machine.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claim may be embodied in a plurality of forms.

Referring to the drawings, Figure 1 represents a top plan view of a mowing machine showing the device of my invention as attached thereto.

Figure 2 represents a rear elevation of the machine and my invention.

Figure 3:
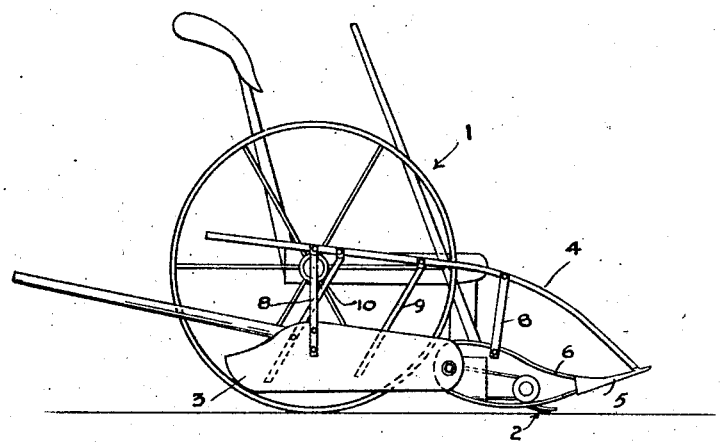
Figure 3 represents a side elevation of the machine showing my invention attached thereto.
Figure 4:
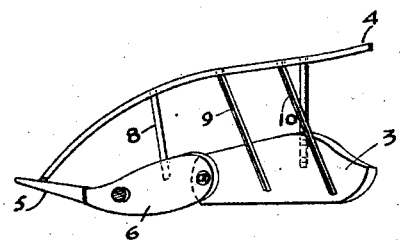
Figure 4 represents a perspective view of the attachment showing the part of the mowing machine to which it is attached.

Referring to the drawings, wherein I have illustrated one practical embodiment of the invention, 1 designates in entirety a mowing machine having the usual cutting or mowing device 2 extending outwardly from one side thereof. Extending rearwardly from the outer end of the mower or cutting device is the customary mould board 3.

The device of my invention comprises a guide bar 4 which at its outer end is connected with a member 5 in turn suitably connected with the end of the guide or runner member 6 which is carried on the outer end of the mower 2. The member 5 extends outwardly and upwardly from the member 6 in front of the mower device 2 and the bar 4 is curved upwardly and rearwardly from the member 5 and extends for the rest of its length in a substantially horizontal plane to a point well rearward of the cutting device. Extending upwardly from the member 6 and mould board 3 are arms 8, to which the bar 4 is secured.

It will thus be seen that the bar 4 extends for the most part substantially parallel to and spaced above the mould board a distance of twelve or more inches above the latter. Extending downwardly and inwardly from the bar 4 at points intermediate of the ends of the latter are deflecting arms 9 and 10. The arm 9 is shorter than the arm 10 and terminates at a point six or more inches from the ground. The arm 10 is spaced from the arm 9 twelve or more inches preferably and at its lower end is spaced from the ground 5 or more inches as desired.

With a mowing machine having the device of my invention attached thereto as described and as illustrated in the drawings, when the machine is operated to cut hay or grain the hay or grain which is cut at the outer end of the mowing device 2 instead of falling outwardly past the outer end of the cutting device will lean against the curved portion of the bar 4 and as the machine is advanced will be forced rearwardly on said bar 4. When the cut stalks encounter the downwardly and inwardly directed arms 9 and 10 they will be deflected inwardly and downwardly along the deflector so as to lie at a point well spaced from the standing hay or grain. When the mowing machine is advanced to cut another row of hay or grain the stalks lying on the ground will be clear of the cutting device 2 and not be subject to having the heads cut off as is the case where no means is provided for preventing the cutting of hay or grain from lying against the uncut portion and in the path of the cutting device.

With the ordinary mower a great deal of the cut hay or grain is exposed to the cutting or mowing device 2 which cuts off the heads of the down grain or hay, which latter will lie against the uncut grain or hay in the path of the cutting device. With my invention all injury to the cut grain or hay will be prevented.

I claim:—

The combination of a mowing machine having a cutting device extending outwardly therefrom and provided with a mould board extending rearwardly from the outer end of the cutting device, of a guide member extending in substantially parallel relation to and well above the mould board and with its forward end disposed downwardly and in front of the cutting device, means for connecting the guide member with the cutting device and means of connection between the mould board and cutting device and deflecting arms extending downwardly and inwardly from the guide member.

CHRIS P. GEORGE.